United States Patent [19]

Rippel

[11] Patent Number: 4,732,482

[45] Date of Patent: Mar. 22, 1988

[54] METHOD AND APPARATUS FOR REDUCING THE DATA RATE IN FOURIER SPECTROSCOPY

[75] Inventor: Harald Rippel, Münich, Fed. Rep. of Germany

[73] Assignee: Kayser-Threde GmbH, Munich, Fed. Rep. of Germany

[21] Appl. No.: 935,412

[22] Filed: Nov. 26, 1986

[30] Foreign Application Priority Data

Nov. 28, 1985 [DE] Fed. Rep. of Germany ....... 3542161

[51] Int. Cl.$^4$ ............................................. G01J 3/00
[52] U.S. Cl. ................................................. 356/346
[58] Field of Search .............................. 356/345, 346

[56] References Cited

U.S. PATENT DOCUMENTS 4,193,693 3/1980 Schindler ............................ 356/346
4,575,246 3/1986 Nishizawa et al. ................. 356/346

FOREIGN PATENT DOCUMENTS 2331890 10/1979 Fed. Rep. of Germany .
3005520 5/1983 Fed. Rep. of Germany .
3014646 12/1983 Fed. Rep. of Germany .

*Primary Examiner*—Eugene R. LaRoche
*Assistant Examiner*—Robert J. Pascal
*Attorney, Agent, or Firm*—Sughrue, Mion, Zinn, Macpeak and Seas

[57] ABSTRACT

To reduce the data rate of a digitalized measuring signal produced in Fourier spectroscopy, the analog signal representing the interferogram is mixed with a second electrical signal whose frequency is modulated in proportion to the deviation of the instantaneous actual speed of the moving mirror of a double beam interferometer from its constant desired speed. Only the difference frequencies produced as a result of the frequency mixing are digitalized and supplied to an associated computer for analysis of the interferogram. The digital measuring signal thus obtained is distinguished by a substantially reduced data rate without giving rise to additional errors in the frequency transformation. To produce the second frequency modulated electrical signal, a laser source is used which supplies a laser beam into the interferometer parallel to the measuring beam. The interferogram of the laser beam produced in the interferometer is converted by a second optoelectrical converter into an electrical signal frequency modulated in a desired manner and is supplied to a frequency mixer.

9 Claims, 4 Drawing Figures

METHOD AND APPARATUS FOR REDUCING THE DATA RATE IN FOURIER SPECTROSCOPY

BACKGROUND OF THE INVENTION

The invention relates to a method and apparatus for reducing the data rate of a digital measuring signal produced in Fourier Spectroscopy. In this connection, in a double beam interferometer the moving mirror of which is displaced at a speed which is as constant as possible, the interferogram of an unknown measuring beam to be analysed is produced and is converted into a first electrical analog signal of high frequency.

The electrical signal produced in this manner corresponds to the Fourier transform of the energy spectrum, thus to the beam strength in dependence upon the wavelength of the interfering beam. The relationship between the optical frequency K of the spectrum and the electrical frequency F is given by:

$$F = v \cdot k, \qquad (1)$$

in which v is the optical displacement speed of the moving mirror in the interferometer. From the above equation (1) it is apparent that with interferometers having a high displacement speed of the mirror a measuring signal of correspondingly high electrical frequency is obtained. This frequency typically lies in the range of 10 to 500 KHz. The interferogram signal is usually analysed with digital computers. For this purpose, the electrical measuring signal must first be digitalized. According to the sampling theorem of information theory, the analog signal must be sampled at a frequency which is at least double the signal frequency in order to enable a true reconstruction of the original interferogram or the spectrum. With the mentioned high frequencies of the measuring signal, this leads to very high data rates of the digitalized signal whose subsequent further processing and storage in the associated computer thus gives rise to problems.

The interferogram produced by the interferometer contains all information concerning the spectrum of the measuring beam to be analysed from frequency zero up to the upper optical boundary frequency. Generally, not all the frequency range of the spectrum is interesting for the analysis but only a particular spectral region characterized by the lower cut-off frequency $F_u$ and the upper cut-off frequency $F_o$. The upper cut-off frequency $F_o$ of the spectral range of interest normally coincides with the upper optical boundary frequency of the interferogram. Even if only the upper spectral range of the interferogram is analyzed with the associated computer, for example by filtering out the lower frequencies with an electrical high pass filter, the problem of high data rates of the digitalized measuring signal, which are difficult to handle, in substance remains.

SUMMARY OF THE INVENTION

It is therefore an object of the invention to provide a method and/or apparatus for reducing the data rate of the digitalized measuring signal obtained in Fourier spectroscopy.

In the solution of this problem the starting point is a method for producing an interferogram of the type described in the introduction; the problem is solved by mixing the first electrical analog signal representing the interferogram with a second electrical analog signal whose frequency is modulated in proportion to the deviation of the instantaneous actual speed of the moving mirror from its constant desired speed, by filtering out the different frequencies obtained as a result of this frequency mixing, and by subsequent digitalizing of the signal filtered out.

In achieving the object relating to the apparatus the starting point is apparatus comprising a double beam interferometer whose moving mirror is displaceable at a speed which is as constant as possible, and an optoelectric converter for converting the interferogram into a corresponding first electrical signal; the object is achieved by the provision of a controlled frequency generator for producing a second electrical signal whose frequency is modulated in proportion to the deviation of the instantaneous actual speed of the moving mirror from its constant desired speed, of a frequency mixer for mixing the first signal representing the interferogram with the frequency modulated second signal, of an electrical low pass filter for filtering out the difference frequencies obtained in the frequency mixer, and of an analog to digital converter for digitalizing the signal filtered out.

An essential feature of the present invention is thus the mixing of the first analog signal representing to interferogram with a second signal whose frequency is modulated by the movement or the movement deviation of the moving mirror in the interferometer. For a better understanding of the invention it will briefly be considered what would happen if the interferogram signal were mixed instead of this with a signal of fixed unmodulated frequency.

By mixing the signal frequency $F_s$ with a fixed mixing frequency $F_m$ in an analog frequency mixer, the sum frequency $F_m + F_s$ and the difference frequency $F_m - R_s$ are obtained. Since the digitalized measuring signal is intended to have the smallest possible data rate, and one must manage for this reason with the lowest possible sampling frequency, the resulting difference frequency is filtered out and only this is supplied in digitalized form to the associated computer.

Since the drive of the optical displacement of the moving mirror in the interferometer maintains the desired constant desired speed $v_o$ only with a certain exactitude $\Delta_v$, the instantaneous actual speed varies by just this value $\Delta_v$:

$$v_{Ist} = v_o + \Delta_v. \qquad (2)$$

As a result of the relationship between the optical frequency K of the spectrum and electrical the frequency F of the measuring signal according to equation (1), the deviation of the actual speed of the moving mirror from its desired speed appears in the signal frequency $F_s$:

$$\Delta F_s = \Delta v \cdot k_s. \qquad (3)$$

The speed deviation of the moving mirror is typically 1%. The electrical signal frequency $F_s$ is associated with the same relative error.

The mixing of the signal frequency $F_s$ with the mixing frequency $F_m$ produces the difference frequency $F_d$:

$$F_d = F_m - F_s. \qquad (4)$$

This frequency $F_d$ is very much smaller than the original signal frequency $F_s$. It is associated with a relative error:

$$\frac{\Delta F_d}{F_d} = \left| \frac{\Delta F_s}{F_m - F_s} \right| \quad (5)$$

The relative error which now appears is thus larger by the factor $$\frac{F_s}{F_m - F_s}.$$

In order to obtain the smallest possible difference frequency, the mixing frequency $F_m$ is so chosen that it is only slightly greater than the signal frequency $F_s$. However, the smaller the difference $F_m - R_s$ becomes, the larger becomes the relative error in the difference frequency produced. Although the absolute error remains unchanged in the order of magnitude of 1%, the relative error which is several times larger prevents exact analysis of the spectrum to be investigated.

Now according to the invention the above described growth of the relative error is prevented during the frequency transformation if instead of a constant mixing frequency an electrical signal is used which changes its frequency according to the unavoidable deviations of the displacement speed of the moving mirror which should be constant in the ideal case. The relative error of the difference frequency $F_d$ then results—making use of equation (1)—as:

$$\frac{\Delta F_d}{F_d} = \frac{\Delta F_m - \Delta F_s}{F_m - F_s} = \frac{\Delta v(K_m - K_s)}{v(K_m - K_s)}. \quad (6)$$

In spite of the transformation of the measuring signal to a substantially lower frequency, the realtive error does not exceed the unavoidable size $$\frac{\Delta v}{v}$$

of the absolute error which is caused by the speed deviations of the displacement of the moving mirror. The frequency transformation is thus carried out in an error neutral manner.

The difference signal obtained as a result of the frequency mixing has substantially lower frequencies than the original measuring signal. The sampling frequency necessary for error free digitalization permitting complete reconstruction of the interferogram can thus likewise be substantially reduced so that the interferogram present finally in digital form has a substantially reduced data rate. The use of the method according to the invention therefore enables the analysis of the interferogram with digital computers which cannot cope with the extremely high data rates of a digitalized interferogram measuring signal which has not been frequency transformed, without the need to simultaneously accept falsification of the measuring signal. Of course, the two electrical signals must be mixed with the same phase position.

In a preferred embodiment of the method according to the invention, the second electrical signal is produced with the aid of a laser beam of fixed optical frequency which is beamed into the interferometer in parallel with the incident measuring beam.

The thus resulting optical interferogram of the laser beam is detected and converted into a corresponding electrical signal, whereby the signal frequency modulated in desired manner is obtained.

In the corresponding apparatus of the invention, a controlled frequency generator for producing the frequency modulated second electrical signal is formed from a laser source, whose laser beam is incident parallel to the measuring beam in the interferometer, the interferometer in which the optical interferogram of the laser is produced, and a further optoelectrical converter for converting the laser interferogram into a corresponding frequency modulated electrical signal. In this embodiment, the electrical signal derived from the laser interferogram is forcibly modulated with a frequency which corresponds exactly to the instantaneous displacement speed of the moving mirror and thus automatically also to the instantaneous deviation of the constant desired speed. Equation (6) is thus automatically fulfilled at this time.

In order to obtain the smallest possible frequency spacing between the second electrical signal and the interferogram signal, it is expedient to subdivide the base frequency of the second electrical signal, before frequency mixing, to a frequency value which lies in the vicinity of the upper boundary frequency of the signal representing the interferogram. For this purpose, an electrical frequency divider may be employed which is connected before the frequency mixer.

In a preferred embodiment of the invention, a focusing mirror is provided in front of the measuring opening of the interferometer, via which the measuring beam is focussed and this focusing mirror has a small opening for the laser beam. In this manner it is achieved in a simple manner that the laser beam is incident parallel to the measuring beam into the interferometer.

Expediently, a deflection mirror is provided which directs the optical interferogram onto an optoelectrical converter and likewise has a small opening through which the laser beam can pass unhindered. The detection of the laser beam can then take place by means of a further small deflection mirror which directs the laser light onto the further optoelectrical converter. In this manner, the greatest possible decoupling of the beam paths of measuring beam and laser beam is achieved.

BRIEF DESCRIPTION OF THE DRAWINGS

An exemplary embodiment of the invention will now be explained with reference to the accompanying drawings, in which.

DETAILED DESCRIPTION OF THE PREFERRED EMBODIMENT

Figure 1:
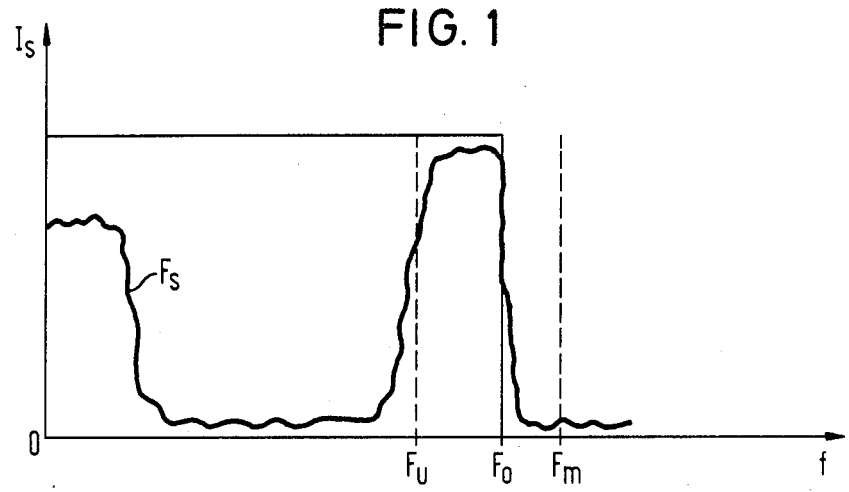
FIG. 1 shows schematically the interferogram of a measuring beam to be analyzed produced by means of a double beam interferometer.

In FIG. 1, there is represented, already converted into an analog electrical signal, the interferogram of a measuring beam to be analyzed. The beam intensity $I_s$ is plotted against the frequency f. The dashed region indicates the spectral region interesting for the analysis, which is defined by the lower cut-off frequency $F_u$ and the upper cut-off frequency $F_o$. Also indicated is the base frequency of a second electrical signal $F_m$ which is intended to be mixed with the interferogram signal $F_s$. The frequency of $F_m$ is only slightly greater than the upper cut-off frequency $F_o$.

Figure 2:
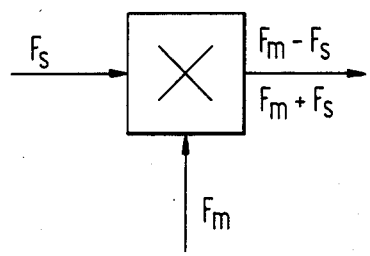
FIG. 2 shows the principle of mixing of the signal $F_s$ representing the interferogram with a second electrical signal $F_m$.

In FIG. 2, the principle of frequency mixing of the interferogram signal $F_s$ and the second electrical signal $F_m$ is represented. At the output of the frequency mixer, the sum frequencies $F_m+F_s$ and the difference frequencies $F_m-F_s$ appear.

Figure 3:
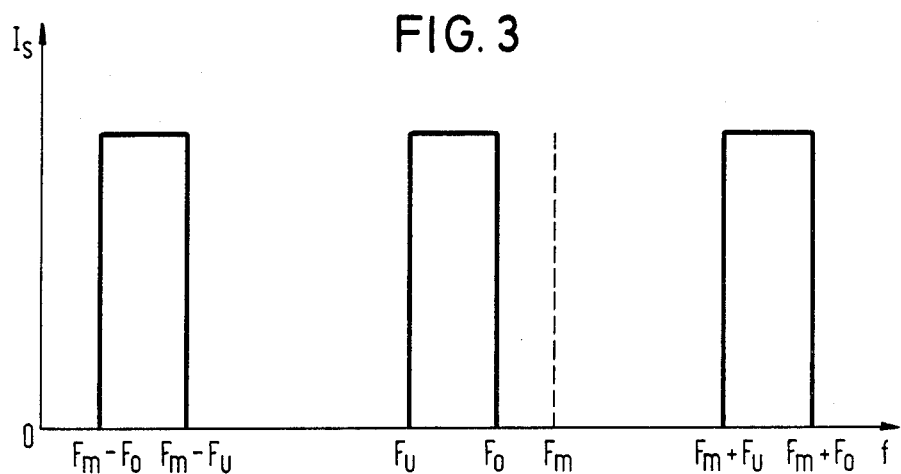
FIG. 3 shows schematically the mixing signals produced according to FIG. 2.

FIG. 3 clarifies the position in the frequency spectrum of the mixing signals produced by the frequency mixing. Only the difference frequencies are provided for further processing. Their lower cut-off frequency $F_m-F_o$ is relatively close to the frequency zero, while the upper cut-off frequency $F_m-F_u$ is still several times lower than the lower cut-off frequency $F_u$ of the original interferogram signal. The difference frequencies are separated from the remaining mixing frequencies before digitalization, for example by means of an electrical low-pass filter.

Figure 4:
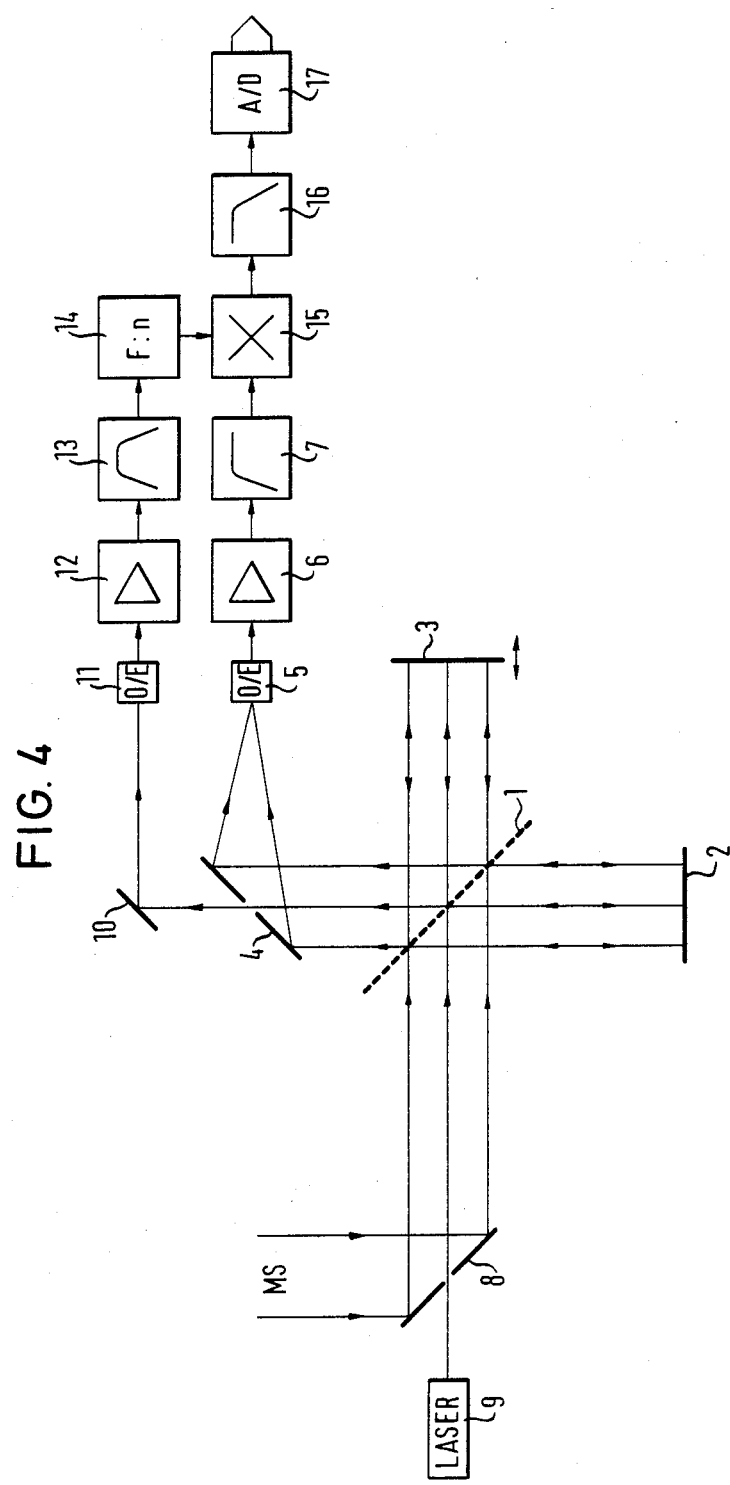
FIG. 4 shows a schematic diagram of an apparatus according to the invention having a laser source.

FIG. 4 illustrates apparatus according to the invention in which the second electrical signal is produced for mixing with the interferogram signal by means of a laser beam. The core of the measuring arrangement is formed by a Michelson interferometer. It consists essentially of a beam splitter 1 in the form of a semitransparent mirror which splits the received measuring beam MS into partial beams. The one partial beam reflected downwardly at right angles is deflected by a fixed mirror 2 in the direction of the beam splitter 1 whilst the the partial beam passes through the semitransparent beam splitter 1 and reaches a mirror 3 moving with a speed which is as constant as possible. From the surface of the moving mirror 3, this partial beam is reflected and is directed upwardly at right angles by the rear side of the beam splitter 1. In this connection, the two partial beams from the fixed mirror 2 and the moving mirror 3 interfere. A deflection mirror 4 gathers the thus produced optical interferogram from the measuring beam MS and directs it onto a first optoelectrical converter 5. Such an interferogram is illustrated in FIG. 1. After amplification in an electronic amplifier 6 the measuring signal is passed through an electrical high pass filter 7 in order to filter out the low frequency.

The measuring beam MS is focused by means of a focusing mirror 8 into the beam path of the interferometer. This focusing mirror 8 has a small central opening through which the laser beam emitted by a laser source 9 is incident into the interferometer parallel to the measuring beam and is received as a partial beam on the moving mirror 3. This partial beam is reflected by the surface of the mirror 3 moving transversely of the optical axis. The laser light there reflected is superimposed with the laser partial beam reflected at the fixed mirror 2 so that a laser interferogram results.

This is directed upwardly at right angles and passes through the deflection mirror 4 which likewise has a small opening for this purpose. Via a small deflection mirror 10, the laser interferogram impinges on a second optoelectrical converter 11. The converted electrical signal at the output of the optoelectrical converter 11 is frequency modulated in proportion to the deviation of the instantaneous actual speed of the moving mirror 3 from its constant desired speed. After passing through an amplifier 12 and a band pass filter 13, the base frequency of this second electrical signal is subdivided in a frequency divider 14 to a frequency value which lies in the vicinity of the upper boundary frequency of the interferogram signal. In an electronic frequency mixer 15, the two signals are frequency mixed at the same phase. The mixed products appearing at the output of the frequency mixer 15 are shown on FIG. 3. The difference frequencies obtained are filtered out by means of a following low pass filter 16 and supplied to an analog to digital converter 17.

The signal present at the output of the analog to digital converter 17 in digital form and representing the interferogram of the measuring beam MS, is distinguished by a substantially reduced data rate.

I claim:

1. A method for reducing the data rate of a digitalized measuring signal product in Fourier spectroscopy, comprising the steps of:
    (a) producing an interferogram of an unknown measuring beam to be analyzed using a double-beam interferometer having a moving mirror displaced at a substantially constant, desired speed,
    (b) converting the interferogram into a first electrical analog signal,
    (c) producing a second electrical analog signal having a frequency modulated in proportion to a deviation between the instantaneous actual speed of the moving mirror and said desired speed,
    (d) mixing the first analog signal representing the interferogram with the second analog signal to obtain sum and difference frequency signals,
    (e) filtering out the difference frequency signal obtained as a result of the frequency mixing, and
    (f) digitalizing the filtered out difference frequency signal.

2. A method according to claim 1, in which the second electrical signal is produced by:
    (a) beaming a laser beam of fixed optical frequency into the interferometer parallel to the incident measuring beam,
    (b) detecting the optical interferogram of the laser beam, and
    (c) converting the laser interferogram into a corresponding electrical frequency modulated signal.

3. A method according to claim 1, in which the base frequency of the second electrical step signal is subdivided before the frequency mixing step into a frequency value which lies in the vicinity of the frequency range of the signal representing the interferogram.

4. An apparatus for reducing the data rate of a digitalized measuring signal produced in Fourier spectroscopy, comprising:
    (a) a double beam interferometer having a moving mirror (3) displaceable at a substantially constant, desired speed;
    (b) an optoelectrical converter (5) for converting an interferogram of an uknown measuring beam to be analyzed, produced by the interferometer, into a corresponding first electrical signal;
    (c) a controlled frequency generator for producing a second electrical signal having a frequency modulated in proportion to a deviation between the instantaneous actual speed of the moving mirror and said desired speed;
    (d) a frequency mixer (15) for mixing the first signal representing the interferogram with the frequency modulated second signal to obtain sum and difference frequency signals;

(e) an electrical low pass filter (16) for filtering out the difference frequency signal appearing in the frequency mixer output; and (f) an analog to digital converter (17) for digitalizing the filtered out difference frequency signal.

5. An apparatus according to claim 4, wherein the controlled frequency generator for producing the frequency modulated second electrical signal comprises:

(a) a laser source (9) whose laser beam is arranged for incidence into the interferometer parallel to the measuring beam; and (b) a further optoelectrical converter (11) for converting the laser interferogram into a corresponding frequency modulated electrical signal.

6. An apparatus according to claim 5, further comprising an electrical frequency divider (14) disposed between the further optoelectrical converter and the frequency mixer.

7. An apparatus according to claim 5, wherein:

(a) a focusing mirror (8) is provided in front of a measuring opening of the interferometer by means of which the measuring beam is focused; and (b) the focusing mirror has an opening for the laser beam.

8. An apparatus according to claim 5, wherein:

(a) a deflection mirror (4) is provided for directing the optical interferogram onto the optoelectrical converter; and (b) the deflection mirror has an opening.

9. An apparatus according to claim 5, wherein a small deflection mirror (10) is provided for deflecting the laser interferogram onto the further optoelectrical converter.

* * * * *